United States Patent
Schulz et al.

(10) Patent No.: US 12,122,718 B2
(45) Date of Patent: Oct. 22, 2024

(54) METHOD OF INCREASING THE STABILITY OF A SLAG

(71) Applicant: IMERTECH SAS, Paris (FR)

(72) Inventors: Klaus Schulz, Wessel (DE); Hervé Tavernier, Abbeville (FR)

(73) Assignee: CALDERYS FRANCE, Sezanne (FR)

( * ) Notice: Subject to any disclaimer, the term of this patent is extended or adjusted under 35 U.S.C. 154(b) by 20 days.

(21) Appl. No.: 17/611,617

(22) PCT Filed: Apr. 22, 2020

(86) PCT No.: PCT/EP2020/061158
§ 371 (c)(1),
(2) Date: Nov. 16, 2021

(87) PCT Pub. No.: WO2020/233928
PCT Pub. Date: Nov. 26, 2020

(65) Prior Publication Data
US 2022/0250979 A1   Aug. 11, 2022

(30) Foreign Application Priority Data
May 17, 2019   (EP) .................................... 19305634

(51) Int. Cl.
*C04B 18/02* (2006.01)
*C04B 18/14* (2006.01)
*C04B 111/00* (2006.01)

(52) U.S. Cl.
CPC .......... *C04B 18/021* (2013.01); *C04B 18/142* (2013.01); *C04B 2111/00767* (2013.01)

(58) Field of Classification Search
CPC ............. C04B 18/021; C04B 18/142; C04B 2111/00767; C03C 3/064; C03C 10/0054; C03C 10/0063; C03C 3/091
See application file for complete search history.

(56) References Cited

U.S. PATENT DOCUMENTS

| | | | |
|---|---|---|---|
| 3,225,399 A | 12/1965 | Belcher | |
| 4,124,378 A | 11/1978 | Kurdowski et al. | |
| 5,019,160 A * | 5/1991 | Harada | C21B 3/06 75/564 |

FOREIGN PATENT DOCUMENTS

| | | | |
|---|---|---|---|
| CN | 101608248 A | * | 12/2009 |
| CN | 105087911 A | * | 11/2015 |
| CN | 105776851 A | * | 7/2016 |
| CN | 108278901 A | * | 7/2018 |
| GB | 2 437 796 A | | 11/2007 |
| JP | 2942640 B2 | * | 8/1999 |
| KR | 9507181 B1 | * | 7/1995 |
| KR | 950007181 B1 | | 7/1995 |
| KR | 10-2012-0111705 A | * | 10/2012 |
| WO | WO-2009-081137 A1 | | 7/2009 |

OTHER PUBLICATIONS

Branca et al., "A way to reduce environmental impact of ladle furnace slag," Ironmaking and Steelmaking, 36(8), (2009).
Engstrom et al., "Review: Hot stage engineering to improve slag valorisation options," 2nd International Slag Valorisation Symposion, (2011).
Greenhill-Hooper et al., "Upgrading Stainless Steel Slags with Borate," Iron and Steel Technology, (2007).
Database WPI, Week 208560, Thomson Scientific, London, GB; An 2005-589039, XP002795966, -& RU 2 258 678 C2 (Kazkhrom Stock Co), Aug. 20, 2005 (Aug. 20, 2005), paragraphs [0021] - [0047].
Adegoloye G et al: "Mineralogical, composition of EAF slag and stabilised AOD slag aggregates and dimensional stability of slag aggregate concretes", Construction and Building Materials, Elsevier, Netherlands, vol. 115, Apr. 15, 2016 (Apr. 15, 2016), pp. 171-178, XP029534581, ISSN: 0950-0618, DOI:10.1016/J.CONBUILDMAT. 2016.04.036, the whole document.
International Search Report and Written Opinion mailed Jul. 30, 2020, in International Application No. PCT/EP2020/061158.

\* cited by examiner

*Primary Examiner* — Anthony J Green
(74) *Attorney, Agent, or Firm* — KUSNER & JAFFE

(57) ABSTRACT

Methods for increasing the stability of a slag using a source of silica and a source of boron ions, and compositions for use in said methods.

15 Claims, 1 Drawing Sheet

METHOD OF INCREASING THE STABILITY OF A SLAG

CLAIM FOR PRIORITY

This application is a U.S. national phase entry under 35 U.S.C. § 371 from PCT International Application No. PCT/EP2020/061158, filed Apr. 22, 2020, which claims the benefit of priority of European Patent Application No. 19305634.8, filed May 17, 2019, from both of which this application claims priority and both of which are incorporated herein by reference.

TECHNICAL FIELD

The present invention relates generally to uses and methods that increase the stability of a slag. The present invention further relates to the materials and compositions that may be used in these uses and methods.

BACKGROUND

For environmental reasons, it is generally desirable to avoid putting slag waste materials, for example formed from steel making, on landfills, and to instead find uses for the slag materials. However, some slags are difficult to be recycled for various reasons. Slags with high basicity tend to become powdery on cooling, creating a "falling slag". This is thought to be due to the formation of the low-density gamma-polymorph of dicalcium silicate (C2S). The powdery nature of these "falling slags" makes them difficult to use, for example in road construction. Further, the powdery nature of these "falling slags" may result in any chromium and nickel in the slag being released into the environment. It is therefore desirable to provide alternative or improved methods for stabilising slags.

SUMMARY

In accordance with a first aspect of the present invention there is provided a use of a composition to increase the stability of a slag, wherein the composition comprises a source of silica and a source of boron ions, and wherein the composition comprises equal to or greater than about 35 wt % silica.

In accordance with a second aspect of the present invention there is provided a method of making a slag, the method comprising adding a source of silica and a source of boron ions to a slag prior to cooling the slag, wherein the total amount of the source of silica and the source of boron ions includes at least about 35 wt % silica. The slag may be made as a result of a method of making steel.

In accordance with a third aspect of the present invention there is provided a composition comprising from about 5 wt % to about 25 wt % of a source of boron ions and from about 75 wt % to about 95 wt % of a source of silica, wherein the composition comprises at least about 35 wt % silica.

In accordance with a fourth aspect of the present invention there is provided a method for making a composition of the third aspect of the present invention.

In accordance with a fifth aspect of the present invention there is provided a slag obtained by and/or obtainable by any use or method of any aspect of the present invention.

Certain embodiments of any aspect of the present invention may provide one or more of the following advantages:
  improved stability of a slag;
  reduced amount of material required to stabilise a slag;
  reduced melting temperature of the material used to stabilise the slag.

The details, examples and preferences provided in relation to any particular one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

BRIEF DESCRIPTION OF THE FIGURES

The present invention may be described with reference to the following non-limiting Figures in which.

DETAILED DESCRIPTION

Figure 1:
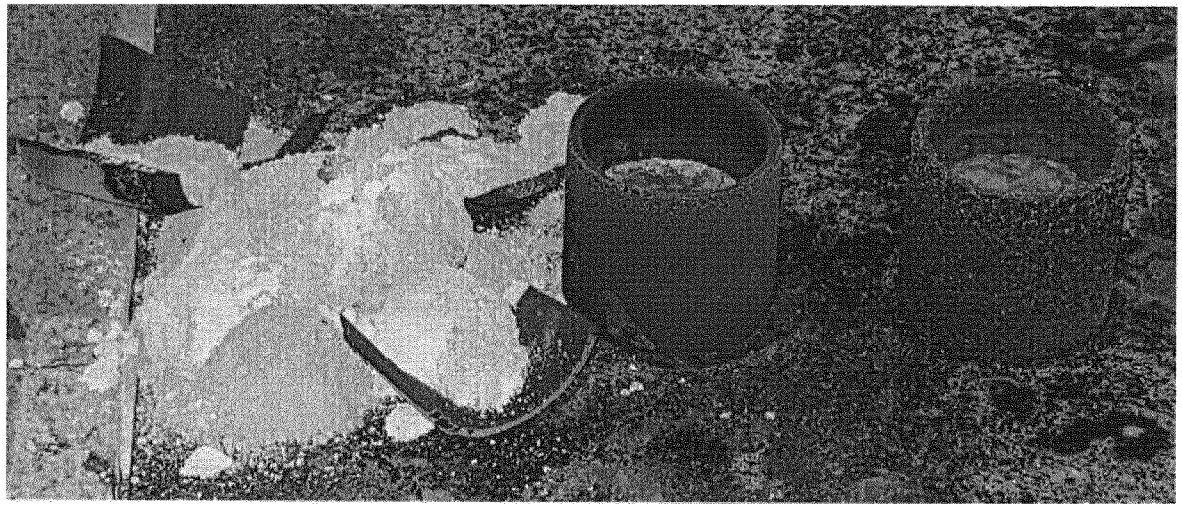
FIG. 1 is a photograph of the mixtures of the standard slag with composition AM (left), composition BM (middle), or composition BG (right) after cooling to 300° C.

The present invention relates to the use of a source of silica and a source of boron ions to increase the stability of a slag. This means that the amount of disintegration or fragmentation of a slag over time (due to the phase change of α- and/or β-dicalcium silicate to γ-dicalcium silicate) is decreased in comparison to the untreated slag.

The stability of the slag may, for example, be increased such that the slag is classified as a non-falling slag. For example, a slag that would, have been classified as a falling slag without the uses and methods described herein may be classified as a non-falling slag as a result of the uses and methods described herein.

A non-falling slag may be defined as a slag that contains equal to or greater than about 20 wt % larnite and/or equal to or less than about 55 wt % calcio-olivine. A non-falling slag may be defined as a slag that meets the requirements of BS 1047 (specification for air-cooled blast furnace slag aggregate for use in construction).

There is therefore provided herein a use of a composition to increase the stability of a slag, wherein the composition comprises a source of silica and a source of boron ions, and wherein the composition comprises equal to or greater than about 35 wt % silica. There is also provided herein a method of making a slag, the method comprising adding a source of silica and a source of boron ions to a slag prior to cooling the slag, wherein the total amount of the source of silica and the source of boron ions includes at least about 35 wt % silica. The source of silica and the source of boron ions may, for example, be added to the slag before the slag is cooled. The source of silica and the source of boron ions may, for example, be added to the slag after it has been separated from the main product of the process from which the slag is made (e.g. after it has been separated from steel), but before the slag has been cooled.

There is further provided herein a composition comprising a source of silica and a source of boron that may be used in the uses and methods described herein. The composition comprises equal to or greater than about 35 wt % silica.

The term "slag" refers to the by-product of methods for purifying metals and/or producing and/or purifying alloys. Any process known to persons killed in the art may be used to produce the slag, particularly processes that produce a falling slag.

The slag may, for example, be a basic slag. The slag may, for example, have a CaO/SiO$_2$ ratio (w/w) ranging from about 0.5 to about 3.0, for example from about 1.0 to about 3.0 or from about 2.0 to about 3.0 or from about 2.4 to about 2.8.

Any slag known to persons skilled in the art, particularly falling slags, can be used for the uses and methods described herein.

In certain embodiments, the slag is a steel slag (i.e. the product that remains after molten steel has been separated from impurities). The steel slag may refer to the by-product that is formed from the steelmaking process or formed from a secondary metallurgical process. In certain embodiments, the slag is a stainless steel slag. The steel slag may, for example, be furnace slag, raker slag, ladle slag, clean out slag, pit slag, or a combination thereof. The steel slag may, for example, be a furnace slag.

Compositions comprising a source of silica and a source of boron ions may be used in the uses and methods described herein. These compositions may, for example, have a melting point equal to or less than about 1200° C. For example, the compositions may have a melting point equal to or less than about 1150° C. or equal to or less than about 1100° C. or equal to or less than about 1050° C. or equal to or less than about 1000° C. or equal to or less than about 950° C. or equal to or less than about 900° C. or equal to or less than about 850° C. For example, the compositions may have a melting point equal to or greater than about 300° C., for example equal to or greater than about 350° C. or equal to or greater than about 400° C. or equal to or greater than about 450° C. or equal to or greater than about 500° C. or equal to or greater than about 550° C. or equal to or greater than about 600° C. For example, the compositions may have a melting point ranging from about 300° C. to about 1200° C., for example from about 400° C. to about 1150° C., for example from about 500° C. to about 1000° C., for example from about 600° C. to about 900° C. The composition may, for example, be added to the slag when the slag is at a temperature lower than the melting point of the composition.

A source of boron ions refers to any compound that contains one or more boron atoms. The source of boron ions may, for example, be a borate. For example, the source of boron ions may be borax, boric oxide (B$_2$O$_3$), boron glass, colemanite or a combination thereof. Borax is also known as sodium borate, sodium tetraborate, or disodium tetraborate. Borax may have various crystal water contents. For example, the borax may comprise anhydrous sodium tetraborate (Na$_2$B$_4$O$_7$), sodium tetraborate pentahydrate (Na$_2$B$_4$O$_7$·5H$_2$O), sodium tetraborate decahydrate (Na$_2$B$_4$O$_7$·10H$_2$O), or a combination of one or more thereof. In certain embodiments, the source of boron ions is borax, for example sodium tetraborate decahydrate (Na$_2$B$_4$O$_7$·10H$_2$O or Na$_2$[B$_4$O$_5$(OH)$_4$]·8H$_2$O).

A source of silica refers to any material that comprises silica (SiO$_2$). The source of silica may, for example, be a glass, a mineral, or any combination thereof. A glass is a non-crystalline amorphous solid that comprises silica and may be artificial or naturally-occurring (e.g. perlite, pumice). A mineral is a naturally occurring chemical compound, which may, for example, comprise an amorphous and/or crystalline form. The mineral may, for example, be a calcined mineral. The mineral may, for example, comprise, consist essentially of or consist of a clay mineral (a hydrous aluminium phyllosilicate). The clay mineral may, for example, be a kaolin mineral (e.g. metakaolin, kaolinite, dickite, halloysite, nacrite), a smectite mineral (e.g. montmorillonite, nontronite, beidellite, saponite), an illite mineral, a chlorite mineral, sepiolite, attapulgite, or a combination of one or more thereof. In certain embodiments, the source of silica comprises, consists essentially of, or consists of a clay mineral, for example a smectite mineral, for example montmorillonite. The montmorillonite may, for example, be bentonite. In certain embodiments, the mineral comprises, consists essentially of, or consists of diatomite (diatomaceous earth). In certain embodiments, the mineral comprises, consists essentially of, or consists of moler. In certain embodiments, the source of silica comprises, consists essentially of, or consists of a calcined clay mineral, calcined diatomite, or calcined moler.

The source of silica may, for example, be a source of amorphous silica. For example, the source of silica may comprise at least about 50 wt % amorphous silica, for example at least about 60 wt % or at least about 70 wt % or at least about 80 wt % or at least about 90 wt % or at least about 95 wt % amorphous silica.

The term "smectite mineral" used herein refers to a material that comprises a smectite mineral structure, namely a 2:1 structure of an octahedral sheet sandwiched between two tetrahedral sheets. Smectite minerals have a variable net negative charge, which may be balanced by one or more cations such as sodium, potassium, calcium, iron, aluminium or magnesium cations, or by hydrogen adsorbed externally on interlamellar surfaces.

For example, the smectite mineral may comprise, consist essentially of or consist of montmorillonite, beidellite, nontronite, saponite, hectorite or a combination of one or more thereof. In certain embodiments, the smectite mineral comprises, consists essentially of or consists of montmorillonite. Bentonite is a smectite mineral comprising mostly montmorillonite. Therefore, in certain embodiments, the smectite mineral is bentonite. The smectite mineral may, for example, be calcined.

The term "moler" refers to a naturally-occurring composite comprising diatomite and smectite mineral. Thus, moler may provide both the smectite mineral and the second mineral components of the compositions described herein. The terms "smectite mineral" and "diatomite" therefore both encompass moler. In certain embodiments, compositions comprising moler further comprise an additional smectite, palygorskite, or sepiolite mineral, for example an additional smectite mineral such as bentonite. The moler may, for example, be calcined.

The terms "diatomite" and "diatomaceous earth" are used interchangeably. Diatomite is typically obtained from a natural diatomaceous earth, which may be obtained from a saltwater source or from a freshwater source. The diatomite may be diatomite in its crude form or after subjecting the material to one or more processing steps. The diatomite may, for example, be calcined.

Diatomite is, in general, a sedimentary biogenic silica deposit comprising the fossilized skeletons of diatoms, one-celled algae-like plants that accumulate in marine or fresh water environments. Honeycomb silica structures generally give diatomite useful characteristics such as absorptive capacity and surface area, chemical stability, and low-bulk density. The diatomite may comprise about 90% SiO$_2$ mixed with other substances. Crude diatomite may comprise about 90% SiO$_2$, plus various metal oxides, such as but not limited to Al, Fe, Ca, and Mg oxides. The diatomite may have any of the various appropriate forms now known to the skilled artisan or hereafter discovered.

The diatomaceous earth may be a commercially available diatomite product. For example, the diatomite may be a material available under the Celite® trade name available from Imerys Filtration Minerals.

When the minerals used in certain embodiments of the present invention (e.g. as the source of silica and/or as the source of boron ions) are obtained from naturally occurring sources, it may be that some mineral impurities will inevitably contaminate the ground material. In general, however, each mineral component will preferably contain less than 5% by weight, preferably less than 1% by weight of other mineral impurities.

The minerals used in certain embodiments of the present invention may, for example, be processed before or after it is combined with the other components of the compositions described herein in order to obtain a desired particle size. Processing may, for example, comprise grinding, milling and/or sieving.

The composition may, for example, have a particle size such that all particles have a size equal to or less than about 5 mm. This may, for example, assist in adequately mixing the composition with the slag. For example, all particles in the composition may have a size equal to or less than about 4 mm or equal to or less than about 3 mm or equal to or less than about 2 mm or equal to or less than about 1 mm. This may be measured by sieve analysis.

The composition may, for example, have a moisture content equal to or less than about 2 wt %. For example, the composition may have a moisture content equal to or less than about 1.5 wt % or equal to or less than about 1 wt % or equal to or less than about 0.5 wt %. For example, the composition may have a moisture content equal to or greater than about 0 wt % or equal to or greater than about 0.1 wt %. For example, the composition may have a moisture content ranging from about 0 wt % to about 2 wt % or from about 0.1 wt % to about 1 wt %. Moisture content may be measured by heating the composition until there is no further change in weight and calculating the difference in weight before and after heating.

In certain embodiments, the compositions described herein may comprise one or more further additives.

The one or more further additives may, for example, control the melting point of the mixture. For example, the one or more further additives may be soda, soda ash, or a combination thereof.

The one or more further additives may, for example, be a mineral that is different to any mineral sources of silica and/or boron ions that are used. The further mineral may, for example, be selected from one or more of the following: alkaline earth metal carbonate (for example dolomite, i.e. $CaMg(CO_3)_2$), metal sulphate (for example gypsum), metal silicate, metal oxide (for example iron oxide, chromic, antimony trioxide or silica), metal hydroxide, wollastonite, bauxite, talc (for example, French chalk), mica, zinc oxide (for example, zinc white or Chinese white), titanium dioxide (for example, anatase or rutile), zinc sulphide, calcium carbonate (for example precipitated calcium carbonate (PCC), ground calcium carbonate (GCC) or surface-modified calcium carbonate), barium sulphate (for example, barite, blanc fixe or process white), alumina hydrate (for example, alumina trihydrate, light alumina hydrate, lake white or transparent white), clay (for example kaolin, calcined kaolin, China clay or bentonite), diatomaceous earth (diatomite or DE), perlite, and combinations thereof.

Where the source of silica and the source of boron ions are combined to form a composition that is subsequently used for the uses and in the methods described herein, each component of the composition may be combined in any suitable amount and ratio such that the total amounts to 100 wt %.

The composition may, for example, comprise from about 5 wt % to about 25 wt % of the source of boron ions. For example, the composition may comprise from about 6 wt % to about 24 wt % or from about 8 wt % to about 22 wt % or from about 10 wt % to about 20 wt % or from about 12 wt % to about 18 wt % or from about 14 wt % to about 16 wt %, for example about 15 wt % of the source of boron ions.

The composition may, for example, comprise at least about 5 wt % boric oxide ($B_2O_3$). For example, the composition may comprise at least about 6 wt % or at least about 7 wt % or at least about 8 wt % or at least about 9 wt % or at least about 10 wt % boric oxide ($B_2O_3$). The composition may, for example, comprise equal to or less than about 25 wt % boric oxide ($B_2O_3$). For example, the composition may comprise equal to or less than about 20 wt % or equal to or less than about 15 wt % or equal to or less than about 12 wt % boric oxide ($B_2O_3$). For example, the composition may comprise from about 5 wt % to about 25 wt % or from about 5 wt % to about 20 wt % or from about 8 wt % to about 20 wt % or from about 8 wt % to about 15 wt % or from about 8 wt % to about 12 wt % boric oxide ($B_2O_3$).

The composition may, for example, comprise from about 75 wt % to about 95 wt % of the source of silica. For example, the composition may comprise from about 76 wt % to about 94 wt % or from about 78 wt % to about 92 wt % or from about 80 wt % to about 90 wt % or from about 82 wt % to about 88 wt % or from about 84 wt % to about 86 wt %, for example about 85 wt % of the source of silica.

The composition comprises at least about 35 wt % silica. For example, the composition may comprise at least about 40 wt % or at least about 45 wt % or at least about 50 wt % or at least about 55 wt % silica. The composition may, for example, comprise equal to or less than about 80 wt % silica. For example, the composition may comprise equal to or less than about 75 wt % or equal to or less than about 70 wt % or equal to or less than about 65 wt % or equal, silica. For example, the composition may comprise from about 35 wt % to about 80 wt % or from about 45 wt % to about 75 wt % or from about 50 wt % to about 70 wt % or from about 55 wt % to about 65 wt % silica.

The composition may, for example, comprise from about 2 wt % to about 20 wt % of CaO. For example, the composition may comprise from about 3 wt % to about 15 wt % or from about 5 wt % to about 15 wt % or from about 5 wt % to about 10 wt % CaO.

The composition may, for example, comprise from about 0.1 wt % to about 10 wt % $Al_2O_3$. For example, the composition may comprise from about 0.1 wt % to about 5 wt % or from about 0.1 wt % to about 3 wt % or from about 0.5 wt % to about 2 wt % $Al_2O_3$.

The composition may, for example, comprise from about 0.01 wt % to about 10 wt % $Fe_2O_3$. For example, the composition may comprise from about 0.05 wt % to about 5 wt % or from about 0.1 wt % to about 2 wt % or from about 0.1 wt % to about 1 wt % $Fe_2O_3$.

The composition may, for example, comprise from about 2 wt % to about 25 wt % $Na_2O$. For example, the composition may comprise from about 5 wt % to about 20 wt % or from about 10 wt % to about 20 wt % or from about 12 wt % to about 18 wt % or from about 14 wt % to about 16 wt % $Na_2O$.

The mineral content of the composition may be analysed by XRF and DIN EN ISO 12677. Allocation of mineral phases may be estimated by intensity ratios.

The ratio of the source of boron ions to the source of silica may, for example, be from about 1:1 to about 1:20. For example, the ratio of the source of boron ions to the source of silica may, for example, be from about 1:2 to about 1:20 or from about 1:3 to about 1:19 or from about 1:4 to about 1:18 or from about 1:5 to about 1:16 or from about 1:5 to about 1:15 or from about 1:5 to about 1:12 or from about 1:5 to about 1:10.

The ratio of boric oxide ($B_2O_3$) to silica may, for example, be from about 1:3 to about 1:9. For example, the ratio of boric oxide ($B_2O_3$) to silica may be from about 1:4 to about 1:8 or from about 1:5 to about 1:7.

The compositions comprising a source of boron ions and a source of silica may, for example, be used (e.g. may be added to the slag) in an amount equal to or greater than about 0.5 wt % based on the total weight of the slag. For example, the compositions may be used in an amount equal to or greater than about 1 wt % or equal to or greater than about 1.5 wt % or equal to or greater than about 2 wt % or equal to or greater than about 2.5 wt % or equal to or greater than about 3 wt % or equal to or greater than about 3.5 wt % or equal to or greater than about 4 wt % or equal to or greater than about 4.5 wt % or equal to or greater than about 5 wt %, based on the total weight of the slag. The compositions may, for example, be used in an amount equal to or less than about 20 wt % based on the total weight of the slag. For example, the compositions may be used in an amount equal to or less than about 18 wt % or equal to or less than about 16 wt % or equal to or less than about 15 wt % or equal to or less than about 14 wt % or equal to or less than about 12 wt % or equal to or less than about 10 wt % or equal to or less than about 8 wt % or equal to or less than about 6 wt % or equal to or less than about 5 wt %, based on the total weight of the slag. For example, the compositions may be used in an amount ranging from about 0.5 wt % to about 20 wt % or from about 0.5 wt % to about 15 wt % or from about 1 wt % to about 10 wt % or from about 1 wt % to about 8 wt % or from about 1 wt % to about 6 wt % or from about 1 wt % to about 5 wt % based on the total weight of the slag.

The source of boron ions may, for example, be used (e.g. may be added to the slag) in an amount equal to or greater than about 0.025 wt % based on the total weight of the slag. For example, the source of boron ions may be used in an amount equal to or greater than about 0.03 wt % or equal to or greater than about 0.04 wt % or equal to or greater than about 0.05 wt % or equal to or greater than about 0.06 wt % or equal to or greater than about 0.07 wt % or equal to or greater than about 0.08 wt % or equal to or greater than about 0.09 wt % or equal to or greater than about 0.1 wt % based on the total weight of the slag. For example, the source of boron ions may be used in an amount equal to or less than about 5 wt % based on the total weight of the slag. For example, the source of boron ions may be used in an amount equal to or less than about 4 wt % or equal to or less than about 3 wt % or equal to or less than about 2 wt % or equal to or less than about 1 wt % based on the total weight of the slag. For example, the source of boron ions may be used in an amount ranging from about 0.025 wt % to about 5 wt % or from about 0.03 wt % to about 4 wt % or from about 0.04 wt % to about 3 wt % or from about 0.05 wt % to about 2 wt % or from about 0.1 wt % to about 1 wt % based on the total weight of the slag.

The source of silica may, for example, be used (e.g. may be added to the slag) in an amount equal to or greater than about 0.375 wt % based on the total weight of the slag. For example, the source of silica may be used in an amount equal to or greater than about 0.38 wt % or equal to or greater than about 0.39 wt % or equal to or greater than about 0.4 wt % or equal to or greater than about 0.5 wt % or equal to or greater than about 0.6 wt % or equal to or greater than about 0.7 wt % or equal to or greater than about 0.8 wt % or equal to or greater than about 0.9 wt % or equal to or greater than about 1 wt % based on the total weight of the slag. The source of silica may, for example, be used in an amount equal to or less than about 20 wt % based on the total weight of the slag. For example, the source of silica may be used in an amount equal to or less than about 19 wt % or equal to or less than about 18 wt % or equal to or less than about 16 wt % or equal to or less than about 15 wt % or equal to or less than about 14 wt % or equal to or less than about 10 wt % or equal to or less than about 8 wt % or equal to or less than about 6 wt % or equal to or less than about 5 wt % based on the total weight of the slag. For example, the source of silica may be used in an amount ranging from about 0.375 wt % to about 20 wt % or from about 0.375 wt % to about 19 wt % or from about 0.5 wt % to about 15 wt % or from about 1 wt % to about 10 wt % or from about 1 wt % to about 6 wt % or from about 1 wt % to about 5 wt % based on the total weight of the slag.

The source of boron ions and the source of silica may, for example, be used in a suitable amount to produce a slag having a certain chemical or mineral composition. The mineral content of the slag may be analysed by XRF and DIN EN ISO 12677. Allocation of mineral phases may be estimated by intensity ratios.

The slag produced may, for example, have a boron content equal to or greater than about 0.01 wt %. For example, the slag produced may have a boron content equal to or greater than about 0.02 wt % or equal to or greater than about 0.03 wt % or equal to or greater than about 0.04 wt % or equal to or greater than about 0.05 wt %. For example, the slag produced may have a boron content equal to or less than about 0.1 wt % or equal to or less than about 0.9 wt % or equal to or less than about 0.8 wt % or equal to or less than about 0.7 wt %. For example, the slag produced may have a boron content ranging from about 0.01 wt % to about 0.1 wt % or from about 0.02 wt % to about 0.09 wt % or from about 0.04 wt % to about 0.08 wt % or from about 0.05 wt % to about 0.07 wt %. The boron content of the slag may be analysed by X-Ray fluorescence (ICP-OES regarding EN ISO 11885).

The slag produced may, for example, have a larnite ($Ca_2SiO_4$) content equal to or greater than about 20 wt %. For example, the slag produced may have a larnite content equal to or greater than about 25 wt % or equal to, or greater than about 30 wt % or equal to or greater than about 35 wt % or equal to or greater than about 40 wt % or equal to or greater than about 45 wt % or equal to or greater than about 50 wt %. The slag produced may, for example, have a larnite content equal to or less than about 80 wt % or equal to or less than about 75 wt % or equal to or less than about 70 wt % or equal to or less than about 65 wt % or equal to or less than about 60 wt %. For example, the slag produced may have a larnite content ranging from about 20 wt % to about 80 wt % or from about 30 wt % to about 70 wt % or from about 40 wt % to about 60 wt % or from about 45 wt % to about 55 wt % or from about 50 wt % to about 55 wt %.

The slag produced may, for example, have a calcio-olivine ($Ca_2SiO_4$) content equal to or less than about 55 wt %. For example, the slag produced may have a calcio-olivine content equal to or less than about 50 wt % or equal to or less than about 45 wt % or equal to or less than about 40 wt % or equal to or less than about 40 wt % or equal to or less than about 35 wt % or equal to or less than about 30 wt % or equal to or less than about 25 wt % or equal to or less than about 20 wt %. The slag produced may, for example, have a calcio-olivine content equal to or greater than 0 wt %. For example, the slag produced may have a calcio-olivine content equal to or greater than about 1 wt % or equal to or greater than about 5 wt % or equal to or greater than about 10 wt % or equal to or greater than about 15 wt %. For example, the slag produced may have a calcio-olivine content ranging from 0 wt % to about 55 wt % or from about 1 wt % to about 40 wt % or from about 1 wt % to about 30 wt % or from about 2 wt % to about 25 wt % or from about 5 wt % to about 20 wt %.

The slag produced may, for example, have a cuspidine ($Ca_4Si_2O_7F_2$) content equal to or greater than about 5 wt %. For example, the slag produced may have a cuspidine content equal to or greater than about 6 wt % or equal to or greater than about 7 wt % or equal to or greater than about 8 wt % or equal to or greater than about 9 wt % or equal to or greater than about 10 wt %. The slag produced may, for example, have a cuspidine content equal to or less than 20 wt %. For example, the slag produced may have a cuspidine content equal to or less than about 15 wt % or equal to or less than about 12 wt % or equal to or less than about 10 wt %. For example, the slag produced may have a cuspidine content ranging from 5 wt % to about 20 wt % or from about 8 wt % to about 15 wt % or from about 9 wt % to about 12 wt %.

The slag produced may, for example, have a jasmundite ($Ca_{20.7}Mg_{1.3}(SiO_4)_8O_4S_2$) content equal to or less than about 15 wt %. For example, the slag produced may have a jasmundite content equal to or less than about 10 wt % or equal to or less than about 8 wt % or equal to or less than about 6 wt % or equal to or less than about 5 wt % or equal to or less than about 4 wt % or equal to or less than about 2 wt % or equal to or less than about 1 wt %. The slag produced may, for example, have a jasmundite content equal to or greater than 0 wt %. For example, the slag produced may have a jasmundite content equal to or greater than about 1 wt % or equal to or greater than about 2 wt %. For example, the slag produced may have a jasmundite content ranging from 0 wt % to about 15 wt % or from about 1 wt % to about 10 wt % or from about 1 wt % to about 5 wt % or from about 1 wt % to about 2 wt %.

The slag produced may, for example, have a mayenite ($Ca_{12}Al_{14}O_{32}$) content equal to or less than about 10 wt %. For example, the slag produced may have a mayenite content equal to or Jess than about 9 wt % or equal to or less than about 8 wt % or equal to or less than about 7 wt % or equal to or less than about 6 wt % or equal to or less than about 5 wt %. The slag produced may, for example, have a mayenite content equal to or greater than 0 wt %. For example, the slag produced may have a mayenite content equal to or greater than about 1 wt % or equal to or greater than about 2 wt %. For example, the slag produced may have a mayenite content ranging from 0 wt % to about 10 wt % or from about 0 wt % to about 8 wt % or from about 1 wt % to about 6 wt % or from about 1 wt % to about 5 wt %.

The compositions comprising a source of silica and a source of boron ions may, for example, be made by combining the components of the composition, for example with mixing. The composition may, for example be processed before or after it is combined with the other components of the compositions described herein in order to obtain a desired particle size. Processing may, for example, comprise grinding, milling and/or sieving.

The following numbered paragraphs defined particular embodiments of the present invention:

1. Use of a composition to increase the stability of a slag, wherein the composition comprises a source of silica and a source of boron ions, and wherein the composition comprises at least about 35 wt % silica.
2. The use of paragraph 1, wherein the composition has a melting point equal to or less than about 1200° C., for example equal to or less than about 1150° C.
3. The use of paragraph 1 or 2, wherein the slag is a steel slag, for example a stainless steel slag.
4. The use of any preceding paragraph, wherein the source of boron ions is borax, boric oxide ($B_2O_3$), boron glass, colemanite, or a combination thereof.
5. The use of any preceding paragraph, wherein the source of silica is a glass, a mineral, or a combination thereof.
6. The use of any of paragraph 5, wherein the mineral comprises diatomite.
7. The use of any preceding paragraph, wherein the source of silica is moles.
8. The use of any preceding paragraph, wherein the composition comprises from about 5 wt % to about 25 wt % of the source of boron ions and/or wherein the composition comprises from about 5 wt % to about 25 wt % of boric oxide ($B_2O_3$).
9. The use of any preceding paragraph, wherein the composition comprises from about 75 wt % to about 95 wt % of the source of silica and/or wherein the composition comprises at least about 50 wt % silica.
10. The use of any preceding paragraph, wherein the composition is added to the slag prior to cooling of the slag.
11. The use of any preceding paragraph, wherein the composition is used in an amount equal to or greater than about 0.5 wt %, for example equal to or greater than about 1 wt %, based on the total weight of the slag.
12. The use of any preceding paragraph, wherein the composition is used in an amount equal to or less than about 20 wt %, for example equal to or less than about 10 wt %, based on the total weight of the slag.
13. The use of any preceding paragraph, wherein the composition is used in an amount to produce a slag having a boron content equal to or greater than about 0.01 wt %.
14. The use of any preceding paragraph, wherein the composition is used in an amount to produce a slag having a calico-olivine content of equal to or less than about 55 wt % and/or a larnite content equal to or greater than about 20 wt %.
15. A method of making a slag, the method comprising adding a source of silica and a source of boron ions to the slag prior to cooling of the slag.
16. The method of paragraph 15, wherein the method is a method of making a steel slag, for example a stainless steel slag.
17. The method of paragraph 15 or 16, wherein the source of boron ions is borax, boric oxide ($B_2O_3$), boron glass, colemanite, or a combination thereof.
18. The method of any of paragraphs 15 to 17, wherein the source of silica is a glass, a mineral, or a combination thereof.
19. The method of any of paragraph 18, wherein the mineral comprises diatomite.
20. The method of any of paragraphs 15 to 19, wherein the source of silica is moler.
21. The method of any of paragraphs 15 to 20, wherein the source of silica is added to the slag in an amount equal to or greater than about 0.375 wt % by weight of the slag.

22. The method of any of paragraphs 15 to 21, wherein the source of boron is added to the slag in an amount equal to or greater than about 0.025 wt % by weight of the slag.

23. The method of any of paragraphs 15 to 22, wherein the source of silica and the source of boron ions are added to the slag as a composition comprising the source of silica and the source of boron ions.

24. The method of paragraph 23, wherein the composition has a melting point equal to or less than about 1200° C., for example equal to or less than about 1150° C.

25. The method of paragraph 23 or 24, wherein the composition comprises from about 5 wt % to about 25 wt % of the source of boron ions.

26. The method any of paragraphs 23 to 25, wherein the composition comprises from about 75 wt % to about 95 wt % of the source of silica.

27. The method of any of paragraphs 23 to 26, wherein the composition is added to the slag in an amount equal to or greater than about 0.5 wt %, for example equal to or greater than about 1 wt %, based on the total weight of the slag.

28 The method of any of paragraphs 23 to 27, wherein the composition is added to the slag in an amount equal to or less than about 20 wt %, for example equal to or less than about 10 wt %, based on the total weight of the slag.

29. The method of any of paragraphs 23 to 28, wherein the composition is added to the slag in an amount to produce a slag having a boron content equal to or greater than about 0.01 wt %.

30. The method of any of paragraphs 23 to 29, wherein the composition is added to the slag in an amount to produce a slag having a calico-olivine content equal to or less than about 55 wt % and/or a larnite content equal to or greater than about 20 wt %.

31. A composition comprising:
from about 5 wt % to about 25 wt of a source of boron ions; and
from about 75 wt % to about 95 wt % of a source of silica.

32. The composition of paragraph 31, wherein the composition has a melting point equal to or less than about 1200° C., for example equal to or less than about 1150° C.

33. The composition of paragraph 31 or 32, wherein the source of boron ions is borax, boron oxide ($B_2O_3$), boron glass, colemanite, or a combination thereof.

34. The composition of any of paragraphs 31 to 33, wherein the source of silica is a glass, a mineral, or a combination thereof.

35. The composition of paragraph 34, wherein the mineral comprises diatomite.

36. The composition of any of paragraphs 31 to 35, wherein the source of silica is moler.

EXAMPLES

Example 1

The chemical composition of the materials tested is shown in Table 1. This was determined by XRF and DIN EN ISO 12677. Allocation of mineral phases may be estimated by intensity ratios.

TABLE 1

| | Standard Slag | Borax | Quartz Dust | Glass Powder | Boron Glass | Moler | Bone Ash |
|---|---|---|---|---|---|---|---|
| BaS | 2.59 | | | | | | |
| $SiO_2$ | 23.69 | | 99.75 | 71.00 | 75.00 | 68.3 | 0.54 |
| CaO | 61.38 | | 0.15 | 10.00 | 1.50 | 3.8 | 54.40 |
| MgO | 5.24 | | 0.05 | 1.85 | 0.00 | 1.6 | 1.30 |
| $Al_2O_3$ | 3.72 | | 0.22 | 1.80 | 5.00 | 10.3 | 0.09 |
| $TiO_2$ | 0.14 | | 0.00 | 0.06 | 0.00 | 1.4 | 0.01 |
| $Fe_2O_3$ | 0.95 | | 0.05 | 0.30 | 0.05 | 9.2 | 0.10 |
| $MnO_2$ | 0.01 | | 0.00 | 0.02 | 0.00 | 0.1 | 0.01 |
| $P_2O_5$ | 0.01 | | 0.00 | 0.01 | 0.00 | 0.5 | 41.60 |
| $Na_2O$ | 0.07 | 30.65 | 0.07 | 12.70 | 7.00 | 0.7 | 1.10 |
| $K_2O$ | 0.01 | | 0.01 | 0.075 | 0.60 | 1.4 | 0.08 |
| F | 7.52 | | | | | | 0.01 |
| $B_2O_3$ | | 68.85 | | | 10.50 | | |
| $Li_2O$ | | | | | | | |
| BaO | | | | | | | |
| C-FREI | 0.06 | | | | | 0.08 | 0.26 |
| $CO_2$ | 0.65 | | | | | 0.76 | 0.4 |
| C-TOT | 0.24 | | | | | 0.29 | 0.37 |
| S-TOT | | | | | | 0.37 | 0.1 |
| H2O-105 | | | | | | 0.72 | 0.18 |
| H2O-950 | 0.01 | | | | | 1.23 | 0.21 |

A number of materials were combined with a standard slag in the weight percentages shown in Table 2 below. It was observed whether the mixtures created a falling slag (F) or a non-falling slag (NF).

The materials all had a grain size such that 30-70 wt % of particles were smaller than 32 μm and 97-99 wt % of particles were smaller than 125 μm.

TABLE 2

| Materials (%) | | Falling (F) or |
|---|---|---|
| | Standard Slag | Non-Falling (NF) |
| Borax | | |
| 1.5 | 98.5 | NF |
| Quartz Dust | | |
| 10 | 90 | NF |
| 5 | 95 | F |
| Glass Powder | | |
| 10 | 90 | NF |
| 5 | 95 | F |
| Boron Glass | | |
| 10 | 90 | NF |
| 5 | 95 | NF |
| 2.5 | 97.5 | NF |
| Calcium Silicate | | |
| 10 | 90 | NF |
| 5 | 95 | F |
| Moler | | |
| 10 | 90 | NF |
| 5 | 95 | F |

Example 2

The same materials used in Example 1 above were combined to make the following compositions.

Composition BG: 15 wt % Borax, 85 wt % Glass Powder
Composition BM: 15 wt % Borax, 85 wt % Moler Composition BI: 15 wt % Borax, 85 wt % Calcium Silicate
Composition AM: 50 wt % bone ash 50 wt % moler The chemical composition of compositions BG, BM, and AM is shown in Table 3. This was determined by XRF and DIN EN ISO 12677. Allocation of mineral phases may be estimated by intensity ratios.

TABLE 3

|  | Composition BG | Composition BM | Composition AM |
|---|---|---|---|
| BaS | 0.14 | 0.06 | 0.85 |
| $SiO_2$ | 60.35 | 58.06 | 34.42 |
| CaO | 8.50 | 3.23 | 29.10 |
| MgO | 1.57 | 1.36 | 1.45 |
| $Al_2O_3$ | 1.53 | 8.76 | 5.20 |
| $TiO_2$ | 0.05 | 1.19 | 0.71 |
| $Fe_2O_3$ | 0.26 | 7.82 | 4.65 |
| $MnO_2$ | 0.02 | 0.09 | 0.06 |
| $P_2O_5$ | 0.01 | 0.43 | 21.05 |
| $Na_2O$ | 15.39 | 5.19 | 0.90 |
| $K_2O$ | 0.64 | 1.19 | 0.74 |
| F | 0.00 | 0.00 | 0.01 |
| $B_2O_3$ | 10.33 | 10.33 |  |
| C-FREI |  | 0.07 | 0.17 |
| $CO_2$ |  | 0.65 | 0.58 |

The melting points of the compositions were also determined.
Composition BG: 827° C.
Composition BM: 1145° C.
Composition BI: >1460° C.
Composition AM: 1397° C.

Compositions BG and BM with lower melting points are particularly useful for stabilising slags.

Example 3

The compositions made in Example 2 were further tested to determine their influence on the falling behaviour of slag.

2 wt % of each composition was combined with the standard slag used in Example 1. All samples were premixed before melting. The crucibles containing the mixtures were heated in a Tammann furnace to 1600° C., stirred with a tungsten rod to homogenize the melt and kept at 1600° C. for 30 minutes. The crucibles were transferred to a hot muffle furnace (1300° C.) and cooled down by 5° C. per minute to prevent any stabilization effect due to a fast cooling.

Figure 2:
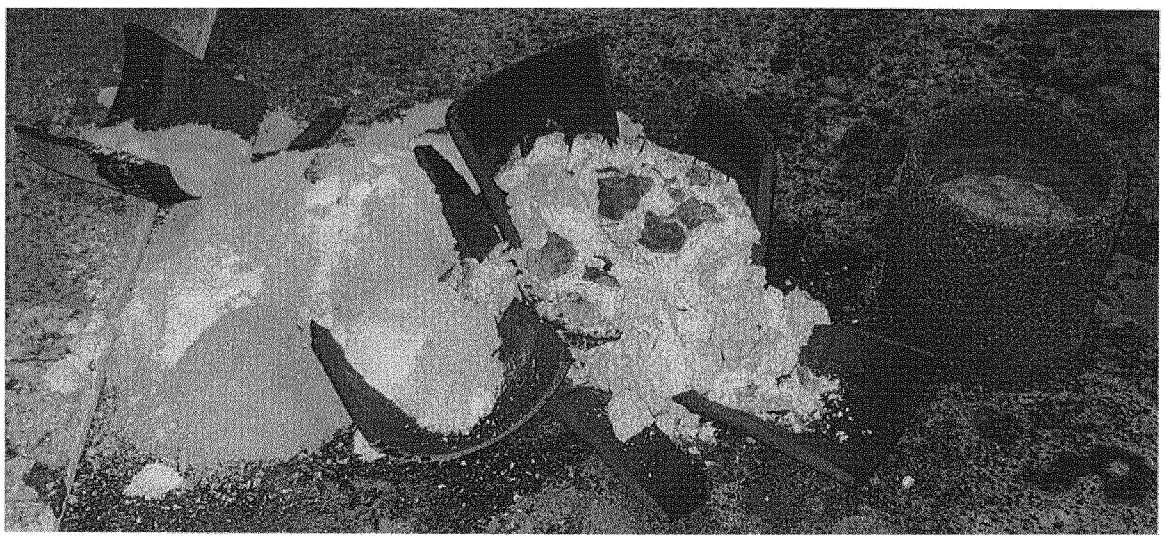
FIG. 2 is a photograph of the mixtures of the standard slag with composition AM (left), composition BM (middle), or composition BG (right) after cooling to 50° C.

The results are shown in FIGS. 1 and 2. FIG. 1 shows the results after cooling to 300° C. FIG. 2 shows the results after cooling to 50° C. From left to right, the compositions were composition AM, composition BM, composition BG.

After cooling to 300° C., composition AM disintegrated completely. After cooling to 50° C. (approximately 3 hours later), composition BM also disintegrated to some coarser particles. Composition BG was stabilized without any disintegration.

The chemical and mineral compositions of the standard slag and mixtures of the standard slag with compositions AM, BM, or BG were analysed by XRF and DIN EN ISO 12677), boron by ICP-OES and EN ISO 11885, and fluoride by DIN 51084. Allocation of mineral phases was estimated by intensity ratios. The results are shown in Tables 4 and 5 below.

TABLE 4

| (wt %) | Standard Slag | Standard Slag + Composition AM | Standard Slag + Composition BM | Standard Slag + Composition BG |
|---|---|---|---|---|
| $Al_2O_3$ | 3.70 | 3.84 | 3.78 | 3.95 |
| B | <0.01 | <0.01 | 0.059 | 0.062 |
| CaO | 64.0 | 58.8 | 58.7 | 59.1 |
| $Cr_2O_3$ | 0.18 | 0.19 | 0.19 | 0.12 |
| FeO | 0.86 | 0.33 | 0.23 | 0.12 |
| F | 7.77 | 5.55 | 5.86 | 5.78 |
| $K_2O$ | 0.01 | <detection limit | <detection limit | <detection limit |
| MgO | 5.18 | 5.09 | 4.84 | 4.99 |
| MnO | 0.18 | 0.095 | 0.12 | 0.13 |
| $Na_2O$ | 0.01 | <detection limit | <detection limit | <detection limit |
| $P_2O_5$ | 0.01 | 0.28 | <detection limit | <detection limit |
| $SiO_2$ | 24.71 | 23.1 | 23.7 | 23.8 |
| $TiO_2$ | 0.21 | 0.23 | 0.22 | 0.24 |
| $S_{tot}$ | 0.51 | 0.28 | 0.32 | 0.30 |
| $CaO/SiO_2$ | 2.59 | 2.55 | 2.48 | 2.48 |

TABLE 5

|  | Standard Slag | Standard Slag + Composition AM | Standard Slag + Composition BM | Standard Slag + Composition BG |
|---|---|---|---|---|
| Larnite $Ca_2SiO_4$ |  |  | 50 | 45 |
| Calcio-Olivine $Ca_2SiO_4$ | 55 | 75 | 25 | 20 |
| Cuspidine $Ca_4Si_2O_7F_2$ |  |  | 10 | 10 |
| Jasmundite $Ca_{20.7}Mg_{1.3}(SiO_4)_8O_4S_2$ | 15 |  |  |  |
| Mayenite $Ca_{12}Al_{14}O_{33}$ | 10 | 5 | 5 | <5 |
| Spinel $Mg/MnCr_2O_4$ | <5 |  |  |  |
| Periclase MgO | 10 | 10 | 10 | 10 |
| Fluorite $CaF_2$ | 10 | 10 | 10 | 10 |
| Oldhamite CaS |  | <5 | <5 | <5 |

Composition AM increases the amount of calcio-olivine compared to the standard slag. Silica-rich minerals such as Jasmundite and mayenite were transformed into calcico-olivine.

Compositions BM and BG decreases the amount of calico-olivine compared to the standard slag and instead formed the stable mineral larnite (β-C2S). This is thought to be due to the incorporation of boron.

The foregoing broadly describes certain embodiments of the present invention without limitation. Variations and modifications as will be readily apparent to those skilled in the art are intended to be within the scope of the present invention as defined in and by the appended claims.

The invention claimed is:

1. A method of making a slag, the method comprising adding a composition to the slag and subsequently cooling the slag, wherein the composition comprises from about 6 wt % to about 25 wt % of a source of boron ions and from about 75 wt % to about 94 wt % of a source of silica; and a total amount of silica in the composition is about 35 wt % or more.

2. The method of claim 1, wherein the composition has a melting point equal to or less than about 1200° C.

3. The method of claim 1, wherein the slag is a steel slag.

4. The method of claim 1, wherein the source of boron ions is borax, boric oxide ($B_2O_3$), boron glass, colemanite, or a combination thereof.

5. The method of claim 1, wherein the composition comprises at least about 50 wt % silica.

6. The method of claim 1, wherein the composition comprises equal to or less than about 80 wt % silica.

7. The method of claim 1, wherein the composition comprises equal to or greater than about 6 wt % and equal to or less than about 20 wt % boric oxide ($B_2O_3$).

8. The method of claim 1, wherein the composition is used in an amount equal to or greater than about 0.5 wt % and equal to or less than about 20 wt % based on the total weight of the slag.

9. The method of claim 1, wherein source of boron ions and/or source of silica is used in an amount to produce a slag having a boron content equal to or greater than about 0.01 wt %, a calico-olivine content of equal to or less than about 55 wt %, or a larnite content equal to or greater than about 20 wt %.

10. The method of claim 1, wherein the slag is a stainless steel slag.

11. The method of claim 1, wherein source of silica is a glass, a mineral, or a combination thereof.

12. The method of claim 1, wherein the composition has a melting point equal or less than about 900° C.

13. The method of claim 12, wherein the source of boron ions is borax and the source of silica is a glass powder.

14. The method of claim 1, wherein the composition has a melting point equal to or less than about 1200° C.

15. The method of claim 14, wherein the source of boron ions is borax and the source of silica is a glass powder.

* * * * *